United States Patent
Desheng

(10) Patent No.: US 11,661,743 B2
(45) Date of Patent: May 30, 2023

(54) CONNECTOR FOR JOINING BARS

(71) Applicant: Jiangsu Ernest Technology Co. Ltd., Jiangsu (CN)

(72) Inventor: Lu Desheng, Fujian (CN)

(73) Assignee: Jiangsu Ernest Technology Co. Ltd.

( * ) Notice: Subject to any disclaimer, the term of this patent is extended or adjusted under 35 U.S.C. 154(b) by 1134 days.

(21) Appl. No.: 16/319,899

(22) PCT Filed: Jul. 26, 2017

(86) PCT No.: PCT/CN2017/094426
§ 371 (c)(1),
(2) Date: Jun. 13, 2019

(87) PCT Pub. No.: WO2018/019246
PCT Pub. Date: Feb. 1, 2018

(65) Prior Publication Data
US 2019/0352905 A1 Nov. 21, 2019

(30) Foreign Application Priority Data
Jul. 26, 2016 (CN) .......................... 201620793072.0

(51) Int. Cl.
*E04C 5/16* (2006.01)
*F16B 7/18* (2006.01)

(52) U.S. Cl.
CPC .............. *E04C 5/165* (2013.01); *F16B 7/182* (2013.01)

(58) Field of Classification Search
CPC ..... F16B 7/182; Y10T 403/65; Y10T 403/655
See application file for complete search history.

(56) References Cited

U.S. PATENT DOCUMENTS

| | | | | |
|---|---|---|---|---|
| 880,145 | A * | 2/1908 | Kimball | E04F 15/02 403/339 |
| 1,173,647 | A * | 2/1916 | Carmody | F16B 12/58 403/339 |
| 1,500,569 | A * | 7/1924 | Barnhill | E01B 11/26 403/339 |
| 1,655,766 | A * | 1/1928 | Hildebrant | G01C 9/24 33/376 |
| 3,577,105 | A * | 5/1971 | Jones, Jr. | H01P 1/042 403/339 |
| 3,819,198 | A * | 6/1974 | Groves | A63C 5/02 403/339 |
| 4,646,497 | A * | 3/1987 | Hoenle | E04B 1/6137 52/286 |
| 5,333,964 | A * | 8/1994 | Thomas | F16B 7/02 403/339 |
| 6,217,251 | B1 * | 4/2001 | Kato | F16B 17/004 403/364 |
| 8,123,284 | B2 * | 2/2012 | Hedderly | B62D 27/023 296/193.06 |
| 2010/0034582 | A1 * | 2/2010 | Howlett | F16B 5/0052 403/333 |

* cited by examiner

*Primary Examiner* — Daniel J Wiley

(57) ABSTRACT

A connector (10) for jointing bars is provided. It comprises a shank (13) for attaching to a first bar, a connection head (14) jointed to the shank (13). The connection head (14) comprises a projecting post (22) and a well (24), which are in alignment with the longitudinal axis (17) of the shank (13). The size and shape of the well (24) correspond to the size and shape of the projecting post (22). An identical connector is provided for attaching a second bar.

9 Claims, 6 Drawing Sheets

CONNECTOR FOR JOINING BARS

TECHNICAL FIELD

This invention relates to building components for joining opposing metal bars, in particular but not exclusively to, a connector for joining reinforcing bars in concrete structures, and opposing bars used in, for example, industrial, architectural and marine architectural applications.

BACKGROUND

There are numerous existing methods and apparatus for mechanically coupling or joining bars in the construction industry. This has given rise to other applications for example in the architectural or marine architectural industries where stainless steel and designer fixtures are becoming more common. Examples include the use of marine type fittings in balustrading and for suspended staircases. As the main application is however the construction industry, the following prior art discussion will therefore concentrate on previously known methods and couplers used in joining of steel bars usually associated with reinforced concrete structures.

One prior art method relies on threading the ends of reinforcing bars to be joined, so that they can be screwed into an intermediate connector in which female threads have been provided. This method however has the disadvantage of compromising the strength of a bar by having to directly thread the bar itself. The removal of a case hardened and/or an outer layer of the reinforcing bar has the consequential effect of a reduction of the strength of the coupled joint itself.

A further method used in the prior art requires the reinforcing bar diameter to be increased by compressing the end of the bar in a machine. This process is known as swelling and a thread is then cut into the enlarged end of the bar to allow it to be joined to a similarly adapted end of a second bar using an intermediate tube connector with an internal thread provided. This method has the drawback of having to roll threads in the very strong outer layer of the reinforcing bar requiring heavy machinery and a two stage time consuming process. This type of parallel thread connector requires specific torqueing on site to be able to satisfy international standards in relation to slip at the joined bars. This torqueing process is most often not possible when bars are placed close together in typical structures.

A further method requires one of the bars to be contained within an outer tubing wherein the outer tubing is filled with a non shrink grout. This method requires a very large outer tube which often cannot conform to concrete cover requirements, requires a high level of skill to be correctly installed and an unacceptable waiting period on site for the grout to harden. This grout hardening wait time occurs at a critical path step in a structure's construction.

A further method of joining reinforcing bars requires the friction welding of matching male and female threaded ends to lengths of reinforcing bar. These matching ends can be joined by counter rotating the bars so that the friction welded joiner ends screw together. This method has the disadvantage of requiring long lengths of bar to be rotated by the number of turns needed to complete the screwing together of the joint. Once again these joints require tensioning to meet requisite slip requirements and this is often impossible in a work site situation.

A further method of joining reinforcing bars requires the friction welding or crimping of matching male and female ends wherein the male end is fitted with counter opposed spring loaded pins. These pins engage with holes in the outer female tube when the two parts are pushed together. This type of connector requires extremely high tolerance in its machining and has the disadvantage of requiring to be kept free of dirt and contaminants prior to connection. This is often difficult on job sites where reinforcing bar is stacked on dunnage placed on earth.

In all of the above prior art methods of joining reinforcing bar not only is there a reliance on the skill of the operator, but the actual diligence of the operator to effect a secure joint. There have been instances of screwed joints which have only been screwed a few turns because of laziness or carelessness on the part of the operator. This can have dire consequences especially in high rise buildings which rely on the integrity of the reinforced concrete.

All of the aforementioned prior art coupling methods require extreme care, torqueing, tensioning or high tolerance machining and careful handling to be able to achieve the slip required by International Standards.

Some of the methods cannot conform to the slip requirements no matter what action is taken.

SUMMARY

It is therefore an object of the invention to provide a novel and innovative connector for joining bars, for example reinforcing bars, which seeks to address some of the disadvantages of the prior art and also to provide the public with an alternative and useful choice.

In a main aspect, the invention resides in a connector for joining bars comprising,
 a shank for attaching to a first bar;
 a connection head joined to the shank; the connection head including,
 a base with one or more side walls or gussets; the base further including
 a projecting post and a well;
 the post and well in alignment with the longitudinal axis of the shank or base;
 the well size and shape substantially corresponding to the size and shape of the post;
 wherein an identical connector or connector in opposed disposition,
 to which a second bar is attached to its shank,
 can be joined to the first bar by inserting the posts of the oppositely disposed connection heads, into their corresponding wells, and whereby any load or force tending to splay either connection head away from its respective longitudinal axis is substantially resisted by the one or more side walls or gussets.

In an exemplary embodiment, the posts and wells are of a frusta conical configuration and complementarily sized to fit snugly.

In an exemplary embodiment, the posts and wells are of a frusta conical configuration with complementarily sized Morse tapers to lock them together.

In an exemplary embodiment, the one or more side walls or gussets is of a triangular configuration wherein any tensile or compressive force tending to rotate the base away from shank is resisted by the triangular sides.

In an exemplary embodiment, there are two side walls or gussets disposed either side of the post and well which further secures the base to the shank, and wherein on inserting the posts of opposite connection heads, into their corresponding opposing wells also brings the opposing side walls or gussets in contact such that the post and well assemblies are completely enclosed or encapsulated.

To further secure the connection head assembly together, wire can be tied and twisted round the assembly. In an exemplary embodiment, there is a groove on each connection head to securely locate the wire tie.

In an exemplary embodiment, in addition or in the alternative, there can be a countersunk grub screw passing through a hole in the centre of each well, wherein on receiving a post, the grub screw is screwed into a threaded hole in the post thereby securing the post in the well and also locking together the connection head assembly.

BRIEF DESCRIPTION OF DRAWINGS

In order for the invention to be better understood and put into practical effect reference will now be made to the accompanying illustrations, wherein.

DETAILED DESCRIPTION

Figure 1:
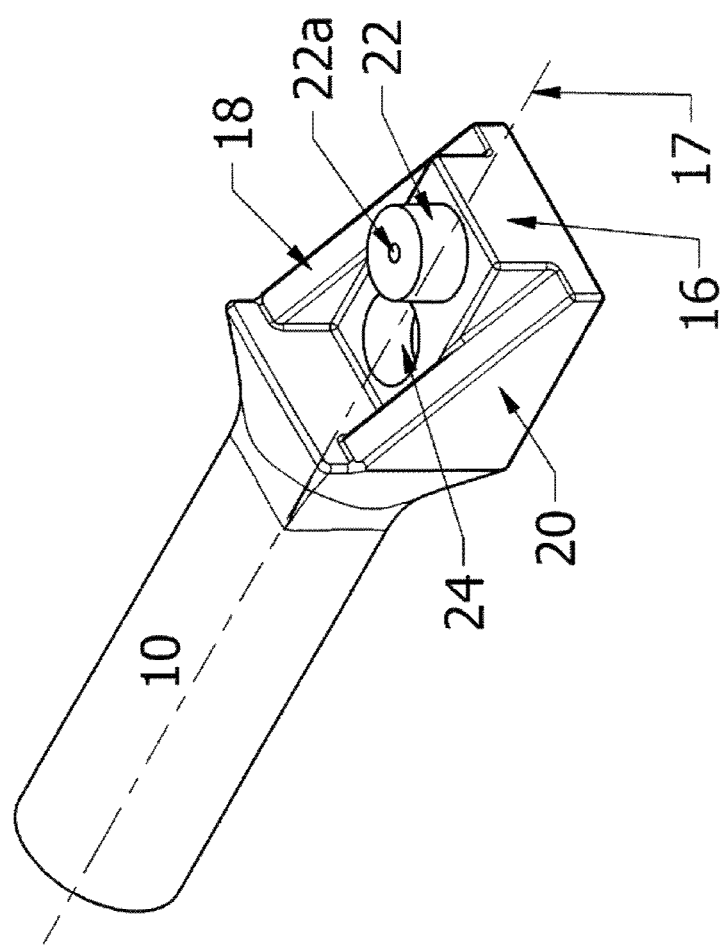
FIG. 1 shows a perspective view of a connector according to an embodiment of the invention.
Figure 2:
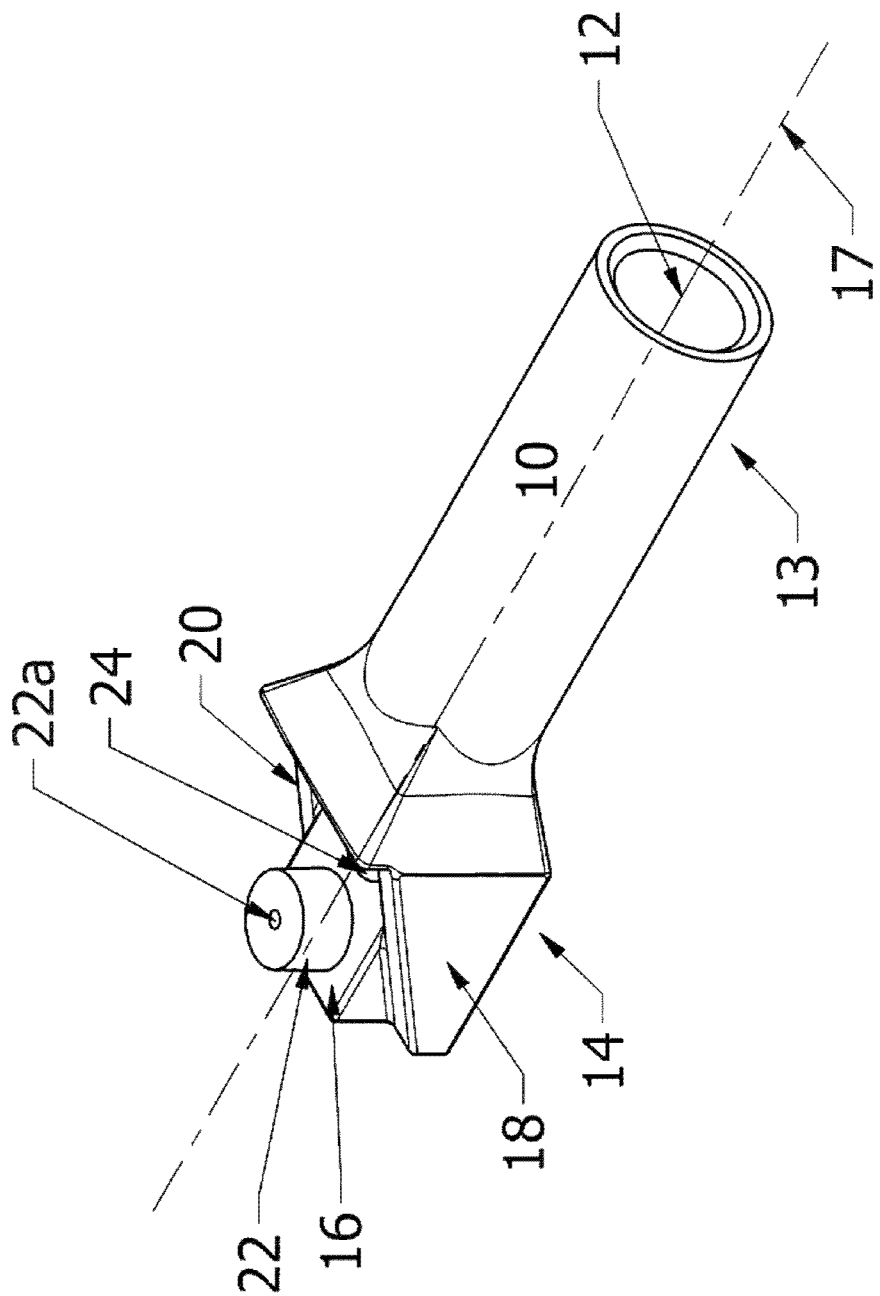
FIG. 2 shows the example of FIG. 1 from another angle.

FIGS. 1 and 2 are perspective views of a connector 10 according to an embodiment of the invention. FIG. 2 also shows the rear of the shank with a hollow configuration 12 to allow a bar (not shown) to be inserted into the shank 13. The shank has a connection head 14 with a base 16 having one or more side walls or gussets 18, 20. Projecting post 22 and well 24 are in alignment with the longitudinal axis 17 of the shank or base. The well and post are of a frusta conical configuration with complementarily sized Morse tapers to lock them together. When two connectors are in opposed disposition, they are joined by inserting the post of one oppositely disposed connection head, into the corresponding well of the other connection head. The side walls or gussets 18, 20 are of a triangular configuration wherein any tensile or compressive force tending to rotate the base 16 or to splay either connection head away from its longitudinal axis 17 is resisted by the triangular sides. The two side walls 18, 20 or gussets disposed either side of the post 22 and well 24 further secures the base 16 to the shank 13.

Figure 3:
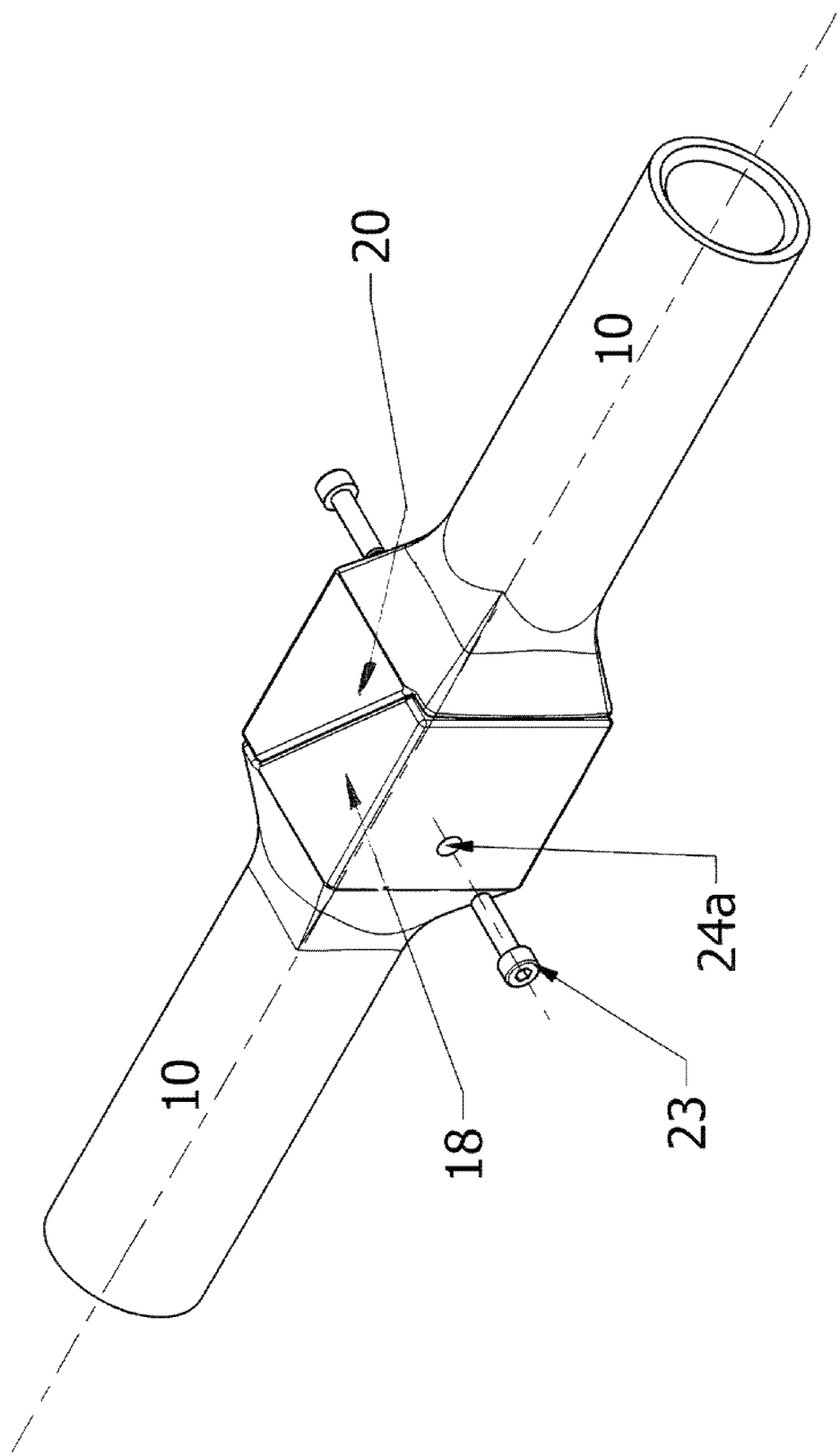
FIG. 3 shows a complete assembly of the connector according to an embodiment of the invention.

FIG. 3 shows where there are two side walls or gussets 18, 20 of a triangular configuration, the post and well assemblies are completely enclosed or encapsulated. To further secure the connection head assembly together, wire can be tied and twisted round the assembly. As previously mentioned, there can be a countersunk grub screw 23 passing through countersunk hole 24a the centre of each well, wherein the grub screw 23 is screwed into a threaded hole (see 22a in FIG. 2) in the post thereby securing the post in the well and also locking together the connection head assembly.

Figure 4:
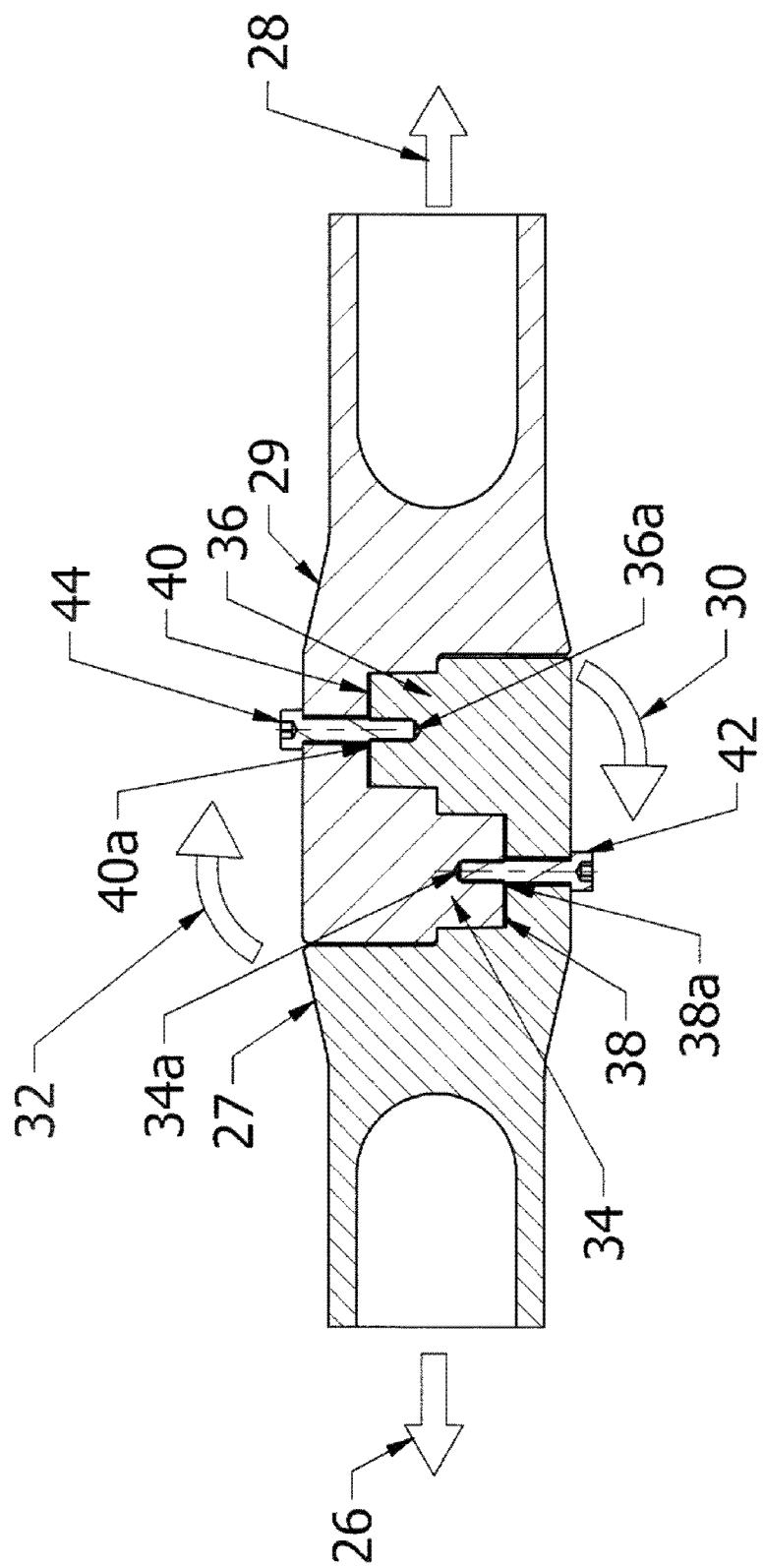
FIG. 4 shows a cross section of the assembly of the connector of FIG. 3 in operation.

FIG. 4 shows a cross section of the connector assembly of FIG. 3 in operation. Tensile forces 26, 28 applied to opposing bars (not shown) tend to splay either connection head 27, 29 away from each other in the direction of arrows 30, 32, respectively. The tension also acts to displace posts 34, 36 from wells 38, 40, respectively. Grub screws 42, 44 passing through holes 38a, 40a in the wells and screwed in threaded holes 34a, 36a in the posts secure the posts in the wells while also locking the connection head assembly together.

Figure 5A:
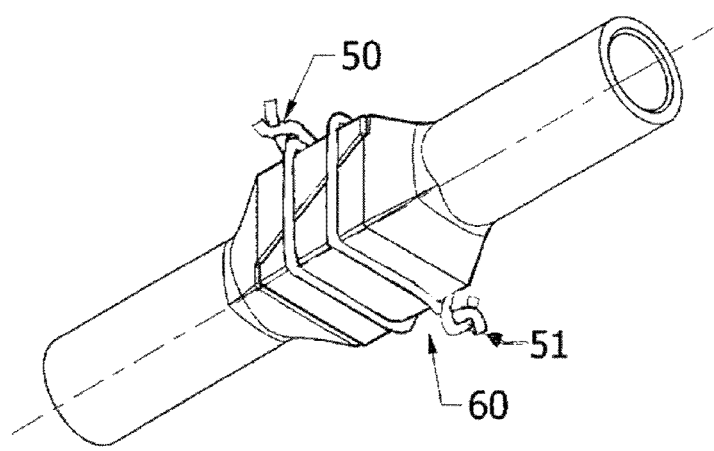
FIGS. 5A and 5B show an alternative or additional method to secure the connection head assembly together.
Figure 5B:
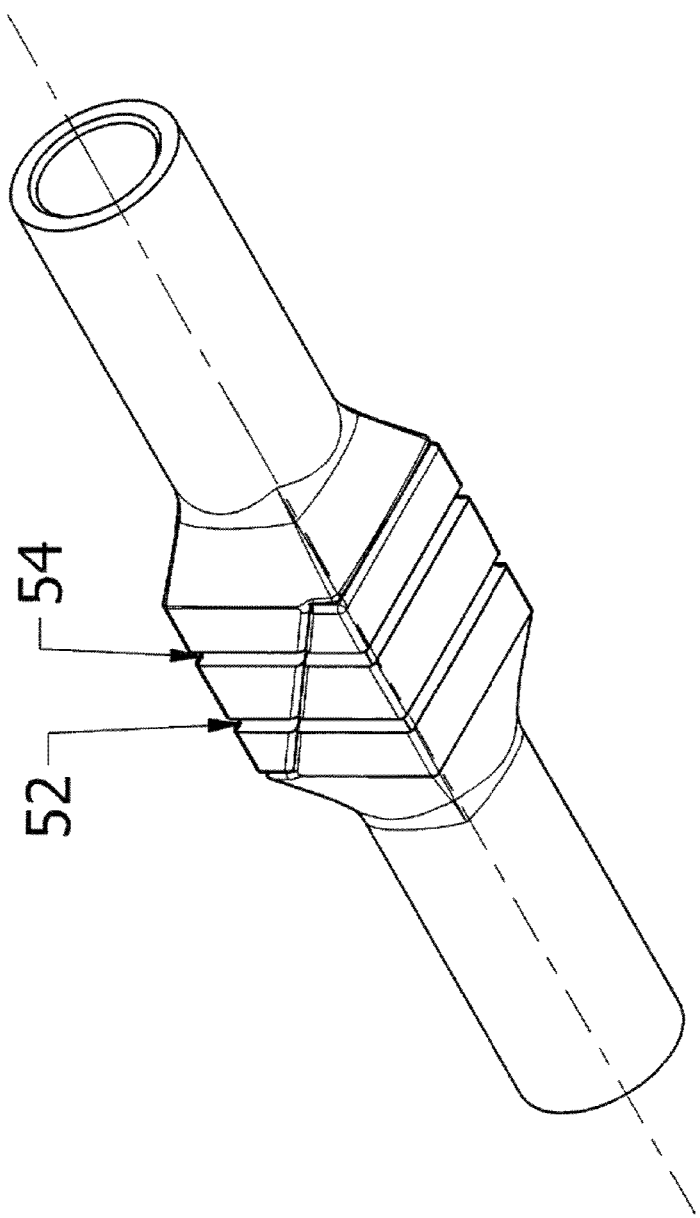

FIGS. 5A and 5B show an alternative or additional method to the use of grub screws to further secure the connection head assembly 60 together. Wire 50, 51 can be tied and twisted round the assembly 60.

Also shown in FIG. 5B are grooves 52, 54 on each connection head to securely locate the wire ties.

Embodiments of the invention may have advantages as follows.

The connector is an assembly comprising two identical parts which are able to be counter opposed and to be pushed together to form a solid joint between bars that are required to be joined axially.

On assembly, it comprises a unitary device wherein there is no need to match male and female ends to the bars. This is a consequence of having a connector of each size which matches every other connector of that size. The fitting of the posts into the wells relies on a tapered fit of an angle designed to provide a Morse Taper type connection. This type of very positive connection is useful to secure the connector assemblies while they are being further secured with conventional wire ties.

It has been discovered when two metal conical parts, each with walls at an angle of 8 degrees or less are fitted together there will be a wedging effect due to the friction between the 2 walls. (i.e. a Morse taper connection). Connectors employing a Morse locking taper have been shown to have the greatest reliability. The Morse connection is shown to leave a gap width smaller than 1 micron. Morse taper connections also absorb vibration and functional stress.

The simplicity of this type of connection means that no tensioning is needed by experienced site personnel to achieve the slip requirements demanded by modern standards. These standards require less than 0.1 mm maximum slip when compared to similar lengths of unjoined bar when loaded to 67% of the nominal bar strength. This 0.1 mm is measured while the load is applied. This test differs from older standards which only measure plastic elongation and ignore excessive elongation while being loaded.

The connectors do not depend on any site input to perform properly and are easy for engineers to inspect. No special equipment is needed to install the connectors and site workers do not need to have to contribute to the efficacy of the connection. Unskilled workers can quickly learn how to use the connectors.

Because there are no complex assembled parts or components, as is the case with some push to lock connectors, there is no danger of contamination of the assembly when the connectors are taken with the bars to be used on site. These bars are often stored on the ground, often in mud or sand. Each connector is a solid piece without multiple components and is robust under all site conditions.

The end or shank of the connector which connects to a bar can be tubular and be crimped to the bar. It can be internally threaded and screw fixed to bar before delivery to site or can have a solid joining end to be friction welded to the bar. This means the connector can be integrated into any rebar supply chain without a need to change the bar connection method.

The two side walls of the connector prevent rotation of the joined connector members under extreme loads and effectively limit all applied loads linearly through the centreline of the connector so as not to impose any side or other vector loads to the surrounding concrete.

Being of a solid construction and having no moving parts, the connector cannot fail due to degradation of any component parts.

Preferably fabricated from alloy steel, the connector has a much greater corrosion resistance to the bars it joins.

The connector can be made from stainless steel if it needed to join stainless steel bars or when used in a marine or architectural application.

What is claimed is:

1. A pair of connectors for joining bars, wherein the pair of connectors comprises of:
   a first connector, comprising:
     a first shank for attaching to a first bar; and
     a first connection head joined to the first shank, the first connection head comprising:
       a first base with one or more first side walls or first gussets, wherein:
         the first base further comprising a first projecting post and a first well;
         the first projecting post and the first well are in alignment with a first longitudinal axis of the first shank or the first base; and
         size and shape of the first well substantially correspond to size and shape of the first projecting post; and
   a second connector, comprising:
     a second shank for attaching a second bar; and
     a second connection head joined to the second shank, the second connection head comprising:
       a second base with one or more second side walls or second gussets, wherein:
         the second base further comprising a second projecting post and a second well;
         the second projecting post and the second well are in alignment with a second longitudinal axis of the second shank or the second base; and
         size and shape of the second well substantially correspond to size and shape of the second projecting post, wherein the size and the shape of the second projecting post and the second well correspond to the respective size and the shape of the first projecting post and the first well, wherein,
           the second bar can be joined to the first bar by inserting the first post of the first connection head into the second well and inserting the second post of the second connection head into the first well, in a manner that any load or force tending to splay either of the connection head is spread away from respective longitudinal axes.

2. The pair of connectors according to claim 1, wherein the posts and the wells of the first and second connectors are of a frusta conical configuration and complementarily sized to fit snugly.

3. The pair of connectors according to claim 1, wherein the posts and the wells of the first and second connectors are of a frusta conical configuration with complementarily sized Morse tapers to lock them together.

4. The pair of connectors according to claim 1, wherein the one or more side walls or gussets of the first and second connectors are of a triangular configuration wherein any tensile or compressive force tending to rotate the base away from shank of the first and second connectors are resisted by the one or more side walls or gussets of the respective first and second connectors.

5. The pair of connectors according to claim 1, wherein there are two side walls or gussets disposed either side of the posts and wells which further secures the base to the shank of the respective first and second connectors.

6. The pair of connectors according to claim 5, wherein on inserting the first post of the first connection head into the second well, and inserting the second post of the second connection head into the first well brings the opposing side walls or gussets of the first and the second connectors in contact such that the posts and the wells are completely enclosed or encapsulated.

7. The pair of connectors according to claim 5, wherein to further secure the connection heads of the first and second connectors together, a wire is tied round the connection heads of the first and second connectors.

8. The pair of connectors according to claim 7, wherein there is a groove on each connection head of the first and second connectors to securely locate the wire.

9. The pair of connectors according to of claim 5, wherein there is a grub screw passing through centre of each well, wherein the grub screw is screwed into a threaded hole in the respective projecting post thereby securing the respective projecting post in the respective well and locking together the connection heads of the first and second connectors.

* * * * *